United States Patent
Chuang et al.

(10) Patent No.: US 10,979,726 B2
(45) Date of Patent: *Apr. 13, 2021

(54) METHOD AND APPARATUS FOR PALETTE INITIALIZATION AND MANAGEMENT

(71) Applicant: HFI Innovation Inc., Zhubei (TW)

(72) Inventors: Tzu-Der Chuang, Zhubei (TW); Wang-Lin Lai, San Jose, CA (US); Yu-Chen Sun, Keelung (TW); Shan Liu, San Jose, CA (US); Xiaozhong Xu, Fremont, CA (US); Yu-Wen Huang, Taipei (TW); Ding-Yun Chen, Taipei (TW)

(73) Assignee: HFI Innovation Inc., Zhubei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/390,362

(22) Filed: Apr. 22, 2019

(65) Prior Publication Data

US 2019/0246125 A1    Aug. 8, 2019

Related U.S. Application Data

(63) Continuation of application No. 15/105,136, filed as application No. PCT/CN2014/094251 on Dec. 18, 2014, now Pat. No. 10,321,141.

(Continued)

(51) Int. Cl.
*H04N 19/196* (2014.01)
*H04N 19/105* (2014.01)
(Continued)

(52) U.S. Cl.
CPC ......... *H04N 19/197* (2014.11); *H04N 19/105* (2014.11); *H04N 19/13* (2014.11);
(Continued)

(58) Field of Classification Search
CPC .... H04N 19/197; H04N 19/106; H04N 19/13; H04N 19/167; H04N 19/176; H04N 19/186; H04N 19/436; H04N 19/593
See application file for complete search history.

(56) References Cited

U.S. PATENT DOCUMENTS 6,819,793 B1   11/2004   Reshetov et al.
7,343,037 B1    3/2008   Kadatch
(Continued)

FOREIGN PATENT DOCUMENTS

CN    101068352 A    11/2007
CN    101217668 A     7/2008
(Continued)

OTHER PUBLICATIONS

Yu, Y., et al.; "Adaptive Scan for Large Blocks for HEVC;" Joint Collaborative Team on Video Coding (JCT-VC) of ITU-T SG16 WP3 and ISO/IEC JTC1/SC29/WG11; Jul. 2011; pp. 1-6.
(Continued)

*Primary Examiner* — Farzana Hossain
(74) *Attorney, Agent, or Firm* — Oblon, McClelland, Maier & Neustadt, L.L.P.

(57) ABSTRACT

A method and apparatus perform palette coding of a block of video data by initializing the palette or triplet palette or using a selected palette or triplet palette from a preceding image area for the beginning block of the current image area. The method receives input data associated with a current image area consisting of multiple blocks. For the beginning block, coding palette predictor is determined based on an initial palette or triplet palette or based on a selected palette or triplet palette associated with a selected block located at a location before the end of a preceding image area. For blocks of the current image area, palette coding is applied to
(Continued)

the blocks, where at least one block uses the palette predictor for the beginning block as the palette predictor.

13 Claims, 3 Drawing Sheets

Related U.S. Application Data (60) Provisional application No. 62/055,692, filed on Sep. 26, 2014, provisional application No. 61/952,932, filed on Mar. 14, 2014, provisional application No. 61/952,917, filed on Mar. 14, 2014, provisional application No. 61/921,152, filed on Dec. 27, 2013, provisional application No. 61/917,474, filed on Dec. 18, 2013.

(51) Int. Cl.
| | | |
|---|---|---|
| *H04N 19/176* | (2014.01) | |
| *H04N 19/593* | (2014.01) | |
| *H04N 19/436* | (2014.01) | |
| *H04N 19/13* | (2014.01) | |
| *H04N 19/167* | (2014.01) | |
| *H04N 19/186* | (2014.01) | |

(52) U.S. Cl.
CPC ......... *H04N 19/167* (2014.11); *H04N 19/176* (2014.11); *H04N 19/186* (2014.11); *H04N 19/436* (2014.11); *H04N 19/593* (2014.11)

(56) References Cited

U.S. PATENT DOCUMENTS

| | | | |
|---|---|---|---|
| 7,903,873 | B2 | 3/2011 | Lu et al. |
| 9,641,840 | B2 | 5/2017 | Sakurai et al. |
| 9,654,806 | B2 | 5/2017 | Zou et al. |
| 9,749,628 | B2 | 8/2017 | Chuang et al. |
| 2004/0151372 | A1 | 8/2004 | Reshetov et al. |
| 2009/0010533 | A1 | 1/2009 | Hung |
| 2009/0074307 | A1 | 3/2009 | Lu et al. |
| 2009/0110305 | A1 | 4/2009 | Fenney |
| 2009/0147855 | A1 | 6/2009 | Song et al. |
| 2010/0046628 | A1 | 2/2010 | Bhaskaran et al. |
| 2011/0110416 | A1 | 5/2011 | Lawrence |
| 2011/0135000 | A1 | 6/2011 | Alshina et al. |
| 2013/0003837 | A1 | 1/2013 | Yu et al. |
| 2013/0156309 | A1 | 6/2013 | Yao et al. |
| 2013/0170546 | A1 | 7/2013 | Kim et al. |
| 2013/0251046 | A1 | 9/2013 | Matsunobu et al. |
| 2013/0272401 | A1 | 10/2013 | Seregin et al. |
| 2013/0301734 | A1 | 11/2013 | Gisquet et al. |
| 2014/0003531 | A1 | 1/2014 | Coban et al. |
| 2014/0036033 | A1 | 2/2014 | Takahashi et al. |
| 2014/0086333 | A1 | 3/2014 | Wang |
| 2014/0105002 | A1 | 4/2014 | Pan |
| 2014/0241630 | A1 | 8/2014 | MacInnis et al. |
| 2014/0286427 | A1 | 9/2014 | Fukushima et al. |
| 2014/0301475 | A1 | 10/2014 | Guo et al. |
| 2015/0016501 | A1 | 1/2015 | Guo et al. |
| 2015/0146976 | A1 | 5/2015 | Ma et al. |
| 2015/0341656 | A1 | 11/2015 | Seregin et al. |
| 2017/0127058 | A1* | 5/2017 | Misra .................. H04N 19/105 |
| 2018/0295365 | A1 | 10/2018 | Seregin et al. |

FOREIGN PATENT DOCUMENTS

| | | | |
|---|---|---|---|
| CN | 101340587 | A | 1/2009 |
| CN | 101365136 | A | 2/2009 |
| CN | 101645173 | A | 2/2010 |
| CN | 101816177 | A | 8/2010 |
| CN | 102800365 | A | 11/2012 |
| CN | 103248893 | A | 8/2013 |
| CN | 103392341 | A | 11/2013 |
| CN | 106464873 | A | 2/2017 |
| EP | 0800150 | A2 | 10/1997 |
| EP | 2645719 | A2 | 10/2013 |
| WO | WO2009036255 | A2 | 3/2009 |
| WO | WO 2012/147622 | A1 | 11/2012 |
| WO | WO 2012/160890 | A1 | 11/2012 |
| WO | WO2012171463 | A1 | 12/2012 |
| WO | WO2013046095 | A1 | 4/2013 |
| WO | WO2013069216 | A1 | 5/2013 |
| WO | WO2012147622 | A1 | 7/2014 |
| WO | WO2012160890 | A1 | 7/2014 |
| WO | WO2015179814 | A1 | 11/2015 |

OTHER PUBLICATIONS

Sun, Y.C., et al.; "AHG10: A triplet palette mode combining JCTVC-P0108 and JCTVC-P0198;" Joint Collaborative Team on Video Coding (JCT-VC) of ITU-T SG16 WP3 and ISO/IEC JTC1/SC29/WG11; Mar.-Apr. 2014; pp. 1-9.

Zhu, J., et al.; "AHG10: Adaptive Scan Order on Palette Based Coding;" Joint Collaborative Team on Video Coding (JCT-VC) of ITU-T SG16 WP3 and ISO/IEC JTC1/SC29/WG11; Mar.-Apr. 2014; pp. 1-4.

Guo, X., et al.; "AHG8: Major-color-based screen content coding;" Joint Collaborative Team on Video Coding (JCT-VC) of ITU-T SG16 WP3 and ISO/IEC JTC1/SC29/WG11; Oct.-Nov. 2013; pp. 1-17.

Chen, J., et al.; "Description of screen content coding technology proposal by Qualcomm;" Joint Collaborative Team on Video Coding (JCT-VC) of ITU-T SG16 WP3 and ISO/IEC JTC1/SC29/WG11; Mar.-Apr. 2014; pp. 1-19.

Guo, L., et al.; "Non-RCE3: Modified Palette Mode for Screen content Coding;" Joint Collaborative Team on Video Coding (JCT-VC) of ITU-T SGI6 WP3 and ISO/IEC JTC1/SC29/WG11; Jul.-Aug. 2013; pp. 1-6.

Sun, Y.C., et al.; "Non-RCE4 Cross-CU major color index prediction;" Joint Collaborative Team on Video Coding (JCT-VC) of ITU-T SG16 WP3 and ISO/IEC JTC1/SC29/WG11; Jan. 2014; pp. 1-5.

Chuang, T.D., et al.; "Non-RCE4: Four-neighbor major color index prediction;" Joint Collaborative Team on Video Coding (JCT-VC) of ITU-T SGI6 WP3 and ISO/IEC JTC1/SC29/WG11; Jan. 2014; pp. 1-5.

Sun, Y.C., et al.; "Non-RCE4: Removal of syntax redundancy in RCE4 Test2;" Joint Collaborative Team on Video Coding (JCT-VC) of ITU-T SG16 WP3 and ISO/IEC JTC1/SC29/WG11; Jan. 2014; pp. 1-5.

Guo, L., et al.; "Palette Mode for Screen Content Coding;" Joint Collaborative Team on Video Coding (JCT-VC) of ITU-T SG16 WP3 and ISO/IEC JTC1/SC29/WG11; Apr. 2013; pp. 1-24.

Joshi, R., et al.; "RCE2: Summary report on HEVC Range Extensions Core Experiment 2 (RCE2) on prediction and coding techniques for transform-skip and transform-bypass blocks;" Joint Collaborative Team on Video Coding (JCT-VC) of ITU-T SG16 WP3 and ISO/IEC JTC1/SC29/WG11; Jul.-Aug. 2013; pp. 1-12.

Guo, L., et al.; "RCE3: Results of Test 3.1 on Palette Mode for Screen Content Coding;" Joint Collaborative Team on Video Coding (JCT-VC) of ITU-T SG16 WP3 and ISO/IEC JTC1/SC29/WG11; Jul.-Aug. 2013; pp. 1-7.

Guo, X., et al.; "RCE4 Test 1. Major-color-based screen content coding;" Joint Collaborative Team on Video Coding (JCT-VC) of ITU-T SG16 WP3 and ISO/IEC JTC1/SC29/WG11; Oct.-Nov. 2013; pp. 1-17.

Sun, Y.C., et al.; "SCCE3 Test B.4: Adaptive color index map scan;" Joint Collaborative Team on Video Coding (JCT-VC) of ITU-T SG16 WP3 and ISO/IEC JTC1/SC29/WG11; Jun.-Jul. 2014; pp. 1-16.

Laroche, G., et al.; "Non-RCE: Palette Prediction for Palette mode;" Joint Collaborative Team on Video Coding (JCT-VC) of ITU-T SG 16 WP 3 and ISO/IEC JTC 1/SC 29/WG 11; Jan. 2014; pp. 1-6.

(56) References Cited

OTHER PUBLICATIONS

Seregin, V., et al.; "Non-SCCE3: Palette predictor resetting;" Joint Collaborative Team on Video Coding (JCT-VC) of ITU-T SG 16 WP 3 and ISO/IEC JTC 1/SC 29/WG 11; Jun.-Jul. 2014; pp. 1-4.
Zhu, W., et al.; "Non-RCE3 Template-based palette prediction;" Joint Collaborative Team on Video Coding (JCT-VC) of ITU-T SG 16 WP 3 and ISO/IEC JTC 1/SC 29/WG 11; Apr. 2013; pp. 1-8.
International Search Report dated Mar. 24, 2015, issued in application No. PCT/CN2014/094251.
International Search Report dated Mar. 24, 2015, issued in application No. PCT/CN2014/094234.
Misra, K., et al.; "Modifications to palette coding for tiles/slices/dependent slices/wavefronts;" Joint Collaborative Team on Video Coding (JCT-VC) of ITU-T SG 16 WP 3 and ISO/IEC JTC 1/SC 29/WG 11; Jun.-Jul. 2014; pp. 1-4.
Esenlik, S., et al.; "AHG4: Dependent slices restriction;" Joint Collaborative Team on Video Coding (JCT-VC) of ITU-T SG 16 WP 3 and ISO/IEC JTC 1/SC 29/WG 11; Oct. 2012; pp. 1-6.

\* cited by examiner

METHOD AND APPARATUS FOR PALETTE INITIALIZATION AND MANAGEMENT

CROSS REFERENCE TO RELATED APPLICATIONS

The present invention is a Continuation of patent application Ser. No. 15/105,136, filed on Jun. 16, 2016, which is a 371 Application of Ser. No. PCT/CN2014/094251, which claims priority to U.S. Provisional Patent Application Ser. No. 61/917,474, filed on Dec. 18, 2013, U.S. Provisional Patent Application Ser. No. 61/921,152, filed on Dec. 27, 2013, U.S. Provisional Patent Application Ser. No. 61/952,917, filed on Mar. 14, 2014, U.S. Provisional Patent Application Ser. No. 61/952,932, filed on Mar. 14, 2014 and U.S. Provisional Patent Application Ser. No. 62/055,692, filed on Sep. 26, 2014. The U.S. Provisional Patent Applications are hereby incorporated by reference in their entireties.

TECHNICAL FIELD

The present invention relates to palette coding for video data. In particular, the present invention relates to techniques to improve the performance of palette prediction using more efficient palette initialization and management.

BACKGROUND

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred to as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

Along with the High Efficiency Video Coding (HEVC) standard development, the development of extensions of HEVC has also started. The HEVC extensions include range extensions (RExt) which target at non-4:2:0 color formats, such as 4:2:2 and 4:4:4, and higher bit-depths video such as 12, 14 and 16 bits per sample. One of the likely applications utilizing RExt is screen sharing, over wired- or wireless-connection. Due to specific characteristics of screen contents, coding tools have been developed and demonstrate significant gains in coding efficiency. Among them, the palette coding (a.k.a. major color based coding) techniques represent block of pixels using indices to the palette (major colors), and encode the palette and the indices by exploiting spatial redundancy. While the total number of possible color combinations is huge, the number of colors in an area of picture is usually very limited for typical screen contents. Therefore, the palette coding becomes very effective for screen content materials.

During the early development of HEVC range extensions (RExt), several proposals have been disclosed to address palette-based coding. For example, a palette prediction and sharing technique is disclosed in JCTVC-N0247 (Guo et al., "*RCE3: Results of Test 3.1 on Palette Mode for Screen Content Coding*", Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013 Document: JCTVC-N0247). In JCTVC-N0247, the palette of each color component is constructed and transmitted. The palette can be predicted (or shared) from its left neighboring CU to reduce the bitrate.

An improved palette prediction and sharing technique is disclosed in JCTVC-O0218 (Guo et al., "*Evaluation of Palette Mode Coding on HM-12.0+RExt-4.1*", Joint Collaborative Team on Video Coding (JCT-VC) of ITU-T SG 16 WP 3 and ISO/IEC JTC 1/SC 29/WG 11, 15th Meeting: Geneva, CH, 23 Oct.-1 Nov. 2013, Document: JCTVC-O0218). In JCTVC-O0218, the encoding process is shown as follows.

1. Transmission of the palette: the palette size (number of colors in the palette) is first transmitted, followed by the palette elements (the color values).
2. Transmission of pixel palette index values (indices pointing to the colors in the palette): the index values for the pixels in the CU are encoded in a raster scan order. For each position, a flag is first transmitted to indicate whether the "run mode" or "copy above mode" is being used.
    2.1 "Run mode": In "run mode", a palette index is first signaled followed by "palette_run" (e.g., M). No further information needs to be transmitted for the current position and the following M positions as they have the same palette index as signaled. The palette index (e.g., i) is shared by all three color components, which means that the reconstructed pixel values are (Y, U, V)=(palette$_Y$[i], palette$_U$[i], palette$_V$[i]) (assuming the color space is YUV)
    2.2 "Copy above mode": In "copy above mode", a value "copy_run" (e.g., N) is transmitted to indicate that for the following N positions (including the current one), the palette indices are equal to the palette indices of the ones that are at the same positions in the row above.
3. Transmission of residue: the palette indices transmitted in Stage 2 are converted back to color values and used as the predictor. Residue information is transmitted using HEVC residue coding and is added to the prediction for the reconstruction.

Another palette coding technique is disclosed in JCTVC-O-0182 (Guo et al., "*AHG8. Major-color-based screen content coding*", Joint Collaborative Team on Video Coding (JCT-VC) of ITU-T SG 16 WP 3 and ISO/IEC JTC 1/SC 29/WG 11, 15th Meeting: Geneva, CH, 23 Oct.-1 Nov. 2013, Document: JCTVC-O0182). However, instead of predicting the entire palette from the left CU, individual palette color entry in a palette can be predicted from the exact corresponding palette color entry in the above CU or left CU. In other words, JCTVC-O-0182 discloses an element-by-element palette prediction. Three types of line modes are used for predicting each index line, i.e. horizontal mode, vertical mode and normal mode. In the horizontal mode, all the indices in the same line have the same value. If the value is the same as the first pixel of the above pixel line, only the line mode signaling bits are transmitted. Otherwise, the index value is also transmitted. In vertical mode, the current index line is the same with the above index line. Therefore, only line mode signaling bits are transmitted. In normal mode, indices in a line are predicted individually. For each index position, the index of the left or above neighboring sample is used as predictor, and the prediction symbol is transmitted to the decoder.

Furthermore, JCTVC-O-0182 discloses a technique that classifies pixels into major color pixels (with palette indices pointing to the palette colors) and escape pixel. For major color pixels, the decoder reconstructs pixel value according to major color index (also referred as palette index) and palette. For escape pixel, the encoder would further send the pixel value.

Therefore, it is desirable to develop methods for further improving the coding efficiency and/or reducing the complexity associated with the palette coding.

SUMMARY

A method and apparatus for palette coding of a block of video data by initializing the palette or triplet palette or using a selected palette or triplet palette from a preceding image area for the beginning block of the current image area are disclosed. The method receives input data associated with a current image area consisting of multiple blocks. For the beginning block, a palette predictor is determined based on an initial palette or triplet palette or based on a selected palette or triplet palette associated with a selected block located at a location before the end of a preceding image area. For blocks of the current image area, the palette coding is applied to the blocks, where at least one block uses the palette predictor for the beginning block of the current image area as the palette predictor. The image area may correspond to a CTU row (coding tree unit row), a tile or a slice. The blocks can be configured into block groups. The block may correspond to a CU (coding unit), and the block group may correspond to a CTU (coding tree block) and the image area may correspond to a CTU row.

When the initial palette or triplet palette is used as the palette predictor, the initial palette or triplet palette may correspond to pre-defined values or derived values, such as zero. When the selected palette or triplet palette is used as the palette predictor, the selected block may correspond to the last CU of a selected CTU in the preceding CTU row located at an above-right corner of a beginning CTU in the current CTU row, where the beginning CTU containing the beginning block and the selected palette or triplet palette corresponds to a last coded palette or triple palette of the last CU of the selected CTU. The process of applying palette coding to the beginning block of the current image area using the initial palette or triplet palette or using the selected palette or triplet palette can be performed if WPP (wavefront parallel processing) is ON for the video data and is skipped if the WPP is Off for the video data. If the WPP is OFF for the video data, palette coding is applied to the beginning block of the current image area using a last coded palette or triplet palette of a last coded block in the preceding image area as a palette predictor. In other words, palette coding of the blocks of the current image area and palette coding of the blocks of the preceding image area move forward at a same pace after palette coding of the beginning block of the current image area is started upon completion of palette coding of the selected block in the preceding image area.

One or more syntax elements of each block of the current image can be coded using arithmetic coding, and states of arithmetic coding, such as CABAC (context adaptive binary arithmetic coding), for the beginning block of the current image area can inherit the states of the selected block in the preceding image area.

When the selected palette or triplet palette is used as the palette predictor, the selected block may also correspond to a selected CU in a selected CTU in the preceding image area located above a beginning CTU in the current image area, wherein the beginning CTU containing the beginning block. The selected CU in the selected CTU can be predefined, such as to a nearest CU with respect to the beginning block.

BRIEF DESCRIPTION OF DRAWINGS

FIG. 1 illustrates an example of initialization for CABAC (context adaptive binary arithmetic coding) parsing process when the WPP (wavefront parallel processing) is turned ON.

DETAILED DESCRIPTION

In the present invention, various techniques to improve the performance of palette coding are disclosed. In particular, efficient palette coding techniques regarding palette initialization and management for systems using wavefront parallel processing (WPP) are disclosed. In one embodiment of the present invention, one or more derived color tables are stored in a palette book and a color table may be selected from the palette book for palette prediction. Various means can be used to generate the palette book. For example, a history of the recently encoded palettes can be stored in a "palette book". The current CU may choose one of the palettes stored in the palette book as indicated by book_index as the color table predictor. The color table prediction can be applied on the basis of entry by entry prediction. In this case, each corresponding element of the current color table is predicted by the corresponding element of the palette predictor in the stored color table. The color table prediction can also copy the entire color table. In this case, the entire current color table may be coded from the palette predictor in the stored color table. If the current CU is coded in palette mode, the current palette will replace one color table in the palette book. The new palette is encoded and transmitted to the decoder so that the same palette book updating process can be carried out in the same way at both the encoder and the decoder.

There are various ways to update and order the previously coded palette sets. In one particular example, the palettes, also referred as palette sets, are simply ordered based on their coding order, i.e. the most recently coded palette is stored at the beginning of the "palette book" (i.e., having a smallest index), while the older ones are stored afterwards (i.e., having larger indices). For example, a palette book with size KK may be used to store KK sets of previously coded palettes. When a new palette is being coded, entries 1 to (KK−1) in the "palette book" will be moved to entries 2 through KK in order to make the first entry available for the newly coded palette. This is simply a first-in-first-out updating and ordering process. Various examples of "palette book" based palette coding are illustrated as follows.

CU-wise control of palette sharing using "palette book". The following pseudo-code demonstrates an example of palette sharing using a palette book when the sharing is controlled on a CU-wise basis (i.e., sharing for all color components). The embodiment may also be used for triplet palette format as disclosed in JCTVC-N0249.

```
If (palette_pred)
    Parse syntax book_index
    For (color_index)
        Current CU palette[color_index] = palette_book[book_index]
            [color_index]
        End
Else
    For (color_index)
        Parse syntax num_major_color[color_index]
        For (k<=KK, k>1, k--)
            palette_book[k][color_index] = palette_book[k-1]
                [color_index]
            End
        For (n <= num_major_color[color_index])
            Parse syntax for current CU palette[color_index][n]
            palette_book[0][color_index][n] = current CU
                palette[color_index][n]
            End
    End
End
```

In the above pseudo code, when palette prediction is used as indicated by palette_pred being 1, a palette book index (i.e., book_index) is determined from the bitstream. The palette for the current CU (i.e., Current CU palette[color_index]) is derived from the palette book having book_index (i.e., palette_book[book_index][color_index]). If the current CU does not use palette prediction, entries 1 to (KK-1) in the "palette book" will be moved to entries 2 through KK in order to make the first entry available for the newly coded palette (i.e., palette_book[k][color_index]=palette_book[k-1][color_index] for (k<=KK, k>1, k--)). The newly parsed current CU palette (i.e., Parse syntax for current CU palette [color_index][n]) will be placed in the leading palette book (i.e., palette_book[0][color_index][n]=current CU palette [color_index][n]).

Component-wise control of palette sharing using "palette book". This embodiment is similar to the above embodiment except that the sharing control is component-wise. An exemplary pseudo code according to this embodiment is shown below for each color component.

```
For (color_index)
    If (palette_pred[color_index])
        Parse syntax book_index[color_index]
        palette[color_index]
    palette_book[ book_index[color_index] ][color_index]
    Else
        Parse syntax num_major_color[color_index]
        For (k<=KK, k>1, k--)
            palette_book[k][color_index] = palette_book[k-1]
                [color_index]
            End
        For (n <= num_major_color[color_index])
            Parse syntax for current CU palette[color_index][n]
            palette_book[0][color_index][n] = current CU
                palette[color_index][n]
            End
    End
End
```

Luma/Chroma-wise control of palette sharing using "palette book". While CU-wise and component-wise palette sharing control using "palette book" are shown in the above embodiments respectively, the sharing control of palette book may also be luma/chroma wise. The luma component and the chroma components may have separate sharing controls (e.g., one control flag for luma and one control flag for chroma). Each luma and chroma components may have its own palette. This may be particularly useful for content with different degree of variations in the luma and chroma components. An exemplary pseudo code according to this embodiment is shown below for YUV color format, where a same sharing control flag is for the U and V component (i.e., palette_pred_UV), separate control flags may also be used.

```
If (palette_pred_Y)
Parse syntax book_index_Y
    Current CU palette[Y_index] = palette_book[book_index_Y]
        [Y_index]
Else
    Parse syntax num_major_color[Y_index]
    For (k<=KK, k>1, k--)
        palette_book[k][Y_index] = palette_book[k-1][ Y_index]
        End
    For (n <= num_major_color[Y_index])
        Parse syntax for current CU palette[Y_index][n]
        palette_book[0][Y_index][n] = current CU palette[Y_index][n]
        End
End
If (palette_pred_UV)
Parse syntax book_index_UV
    Current CU palette[U_index] = palette_book[book_index_UV]
        [U_index]
    Current CU palette[V_index] = palette_book[book_index_UV]
        [V_index]
Else
    Parse syntax num_major_color[U_index]
    For (k<=KK, k>1, k--)
        palette_book[k][U_index] = palette_book[k-1][U_index]
        End
    For (n <= num_major_color[U_index])
        Parse syntax for current CU palette[U_index][n]
        palette_book[0][U_index][n] = current CU palette[U_index][n]
        End
    Parse syntax num_major_color[V_index]
    For (k<=KK, k>1, k--)
        palette_book[k][V_index] = palette_book[k-1][V_index]
        End
    For (n <= num_major_color[V_index])
        Parse syntax for current CU palette[V_index][n]
        palette_book[0][U_index][n] = current CU palette[V_index][n]
        End
End
```

Since the "palette book" keeps track and updates the most recently coded palette sets, there is no line buffer issue. The selection of palette book size becomes an issue of tradeoff between providing better palette matching (i.e., using larger book size) and signaling side information (i.e., using smaller book size).

Another design consideration is the duration of the palette to be kept valid before it is being reset. Longer valid duration, for example the entire slice/picture, enables longer memory of the palette to be available for the block. However the error resilience property becomes weaker, as loss of such palette book will affect the decoding of all blocks in the slice/picture.

CU-wise control of palette sharing using "palette book" with palette book size kk=1 and valid duration=1 LCU. This embodiment corresponds to a particular example of the palette book sharing, where only one most recently coded palette is kept in the book (i.e., palette book size kk=1) and the book is reset at the beginning of every LCU (i.e., valid duration=1 LCU). Since there is only 1 entry in the palette book, there is no need to signal the book_index as mentioned in embodiments 4-6. Also, the updating process for the palette book becomes simply replacing the palette book with the current palette. An exemplary corresponding pseudo-code for CU-wise control of palette sharing using "palette book" with palette book size kk=1 and valid duration=1 LCU is shown below.

```
If (begin new LCU)
   Clear palette_book
End
If (palette_pred)
   For (color_index)
      Current CU palette[color_index] = palette_book[color_index]
   End
Else
   For (color_index)
      Parse syntax num_major_color[color_index]
      For (n <= num_major_color[color_index])
         Parse syntax for current CU palette[color_index][n]
         palette_book[color_index][n]= current CU palette[color_index][n]
      End
   End
End
```

As shown in the above example, there is no need for shifting the old palette book to make room for the new one. The palette book is reset at the beginning of each LCU as shown in the pseudo code (i.e., "If (begin new LCU), Clear palette_book").

Component-wise control of palette sharing using "palette book" with palette book size kk–1 and valid duration=1 LCU. An exemplary corresponding pseudo-code for component-wise control of palette sharing using "palette book" with palette book size kk=1 and valid duration=1 LCU is shown below.

```
If (begin new LCU)
      Clear palette_book
End
For (color_index)
   If (palette_pred[color_index])
      Current CU palette[color_index] = palette_book[color_index]
   Else
      Parse syntax num_major_color[color_index]
      For (n <= num_major_color[color_index])
         Parse syntax for current CU palette[color_index][n]
         palette_book[color_index][n] = current CU
         palette[color_index][n]
      End
   End
End
```

Luma/chroma-wise control of palette sharing using "palette book" with palette book size kk=1 and valid duration=1 LCU. An exemplary corresponding pseudo-code for Luma/chroma-wise control of palette sharing using "palette book" with palette book size kk=1 and valid duration=1 LCU is shown below.

```
If (begin new LCU)
      Clear palette_book
End
If (palette_pred_Y)
   Current CU palette[Y_index] = palette_book[Y_index]
Else
   Parse syntax num_major_color[Y_index]
   For (n <= num_major_color[Y_index])
      Parse syntax for current CU palette[Y_index][n]
      palette_book[Y_index][n] = current CU palette[Y_index][n]
   End
End
If (palette_pred_UV)
   Current CU palette[U_index] = palette_book[U_index]
   Current CU palette[V_index] = palette_book[V_index]
Else
   Parse syntax num_major_color[U_index]
   For (n <= num_major_color[U_index])
      Parse syntax for current CU palette[U_index][n]
      palette_book[U_index][n] = current CU palette[U_index][n]
   End
   Parse syntax num_major_color[V_index]
   For (n <= num_major_color[V_index])
      Parse syntax for current CU palette[V_index][n]
      palette_book[V_index][n] = current CU palette[V_index][n]
   End
```

In related art, when a block (e.g., a coding unit (CU)) is not coded in a palette mode, the color table will be reset to zero or set as not available. Therefore, no palette information can be used by following blocks for palette prediction. In order to improve performance, an embodiment of the present invention saves or stores one or more color tables for the non-palette coded CU. The color table for this non-palette coded block can be derived from a coded color table and considered as the color table of this non-palette coded block. Therefore, the color table for a non-palette coded block is "derived" and used for palette prediction of another block. For example, the last coded color table or the color table from a left or an above block can be used as the color table of the non-palette coded block. The color table derived for the non-palette coded block is also referred as a derived color table in this disclosure. When a block is coded in the palette coding mode, the stored color table may be updated by the currently processed color table. These saved or stored color tables can be referenced by the neighboring blocks for palette coding or can be the reference color table for a non-palette coded neighboring block.

Another aspect of the present invention addresses palette initialization for predictive palette coding. When predictive coding is used to code palette across different blocks, the previously coded/decoded palettes (palette book) are used as a predictor. However, certain blocks may not have access to any previously coded/decoded palette such as the first palette-coded block in a slice/picture. If reset mechanism is used, the first palette-coded block can use the reset palette book as the predictor. In the following, various initialization means are disclosed for the initialization of palette book.

Initializing to all zero. In this embodiment, at the beginning of each slice/picture, the palette in the palette book is all reset to zeros for all colors table. As for the reset mechanism, i.e., reset palette at the beginning of a wavefront partition or a tile partition, or the beginning of each LCU row, the palette book is reset to all zeros.

Initializing to specific color values. In this embodiment, when initialization is needed (e.g., beginning of each slice/picture, beginning of each wavefront/tile partitioning, or beginning of each LCU row), specific values are assigned to the palette colors. For YUV video format, the U and V components contain much less variations and tend to concentrate around the mid-level (e.g. 128 for 8-bit format and 512 for 10-bit format). Therefore, in this case, color tables for U and V components can be initialized to values equal to or very close to the mid-level. As for the Y components, zero or the mid-level can be used for initialization. Furthermore, specific values for initialization can be signaled or derived from higher level syntax such as Slice Header (SH), PPS or SPS.

Signaling specific color values in high-level syntax (HLS). Various examples of HLS are disclosed as follows.

Sequence Parameter Set (SPS). As mentioned earlier, the mid-level initialization will be particularly useful for YUV format. Thus, a high-level syntax indicating the color format of the sequence, such as a syntax element in the SPS, can be utilized to specify the usage of mid-level initialization for palette book. One exemplary pseudo code for HLS in the SPS level is shown as follows.

```
If (color_format_id in SPS == YUV)
        Palette initialization with mid-level
Else
        Palette initialization with Zero
```

The mid-level can be 128 for 8-bit format and 512 for 10-bit format.

Picture Parameter Set (PPS). Another embodiment example is to use PPS to specify the initialization values for palette book. This method is particularly useful for different scene settings in a sequence. For example, for pictures in a dark scene, the PPS can indicate initializing the palette book with low values (e.g., 0 for completely dark). On the other hand, for pictures in bright scene, higher color values can be used for initialization. The exact values used for initialization can be explicitly signaled in the PPS.

Another way to assign the initialization values is to analyze the hue of the picture and to signal the initialization values corresponding to the dominant colors of the picture. In one example, when initialization of palette is needed for a portion of a picture (e.g., the beginning of a slice, wavefront or tile), the specific initialization values derived or signaled in the corresponding PPS will be used.

Slice Header (SH). In this example, the initialization values for each slice are signaled in the slice header. In the special case that each picture contains only one slice, this would be equivalent to using PPS. When there are multiple slices in a picture, a finer granularity of palette initialization value selection can be achieved with slice-header based specification. Syntax elements are added to the SH to indicate the specific values to be used for initialization of the palette book. The exact values can be determined in a similar as in the PPS case, e.g. by analyzing the brightness and/or the hue of the slice.

Layer Color Representation

In the palette coding mode, pixels in each CU are classified into major colors and escape pixels. Major colors are the most representative pixel values in a CU, which cover the majority pixels of the CU. On the other hand, escape pixels are the pixels that do not belong to the major colors.

An embodiment of the present invention discloses a layered color (LC) representation to describe major colors. Based on the LC representation, each pixel is represented by a triplet color index. And the triplet color index is predictive coded and transmitted to indicate whether the pixel is a major-color pixel or not. If it is a major-color pixel, it further indicates the major color it belongs to.

To describe major colors in a CU, a two layers description is disclosed in this invention. The first layer describes the most representative color values in each component, called major colors. Based on major colors, the second layer describes the most representative combination, called major (color) combination.

Layered Color Representation

For each CU, an encoder first calculates the histogram of color values for each color component and chooses a set of representative major color values. These major colors are stored as palettes for each color component. Then, based on the set of major color values for each color component, an encoder further chooses a set of representative color combinations. The combinations are recorded as a triplet palette.

The present invention can be applied to any color format such as YUV444, YUV420, YUV422, YUV400 or RGB. The combination of second layer can be applied to all components or a subset of components. For example, for YUV444 and RGB, the combinations of the second layer can be applied on all components as shown in Tables 1(a)-1(d). Tables 1(a)-1(c) correspond to the first layer color table representation, i.e., three individual color tables for respective color components. Table 1(d) is an example of the second layer color representation corresponding to triple index.

TABLE 1(a)

| $1^{st}$ component's major color index | $1^{st}$ component's major color value |
|---|---|
| 0 | value [0][$1^{st}$ color] |
| ... | |
| $N_1$ | value [$N_1$][$1^{st}$ color] |

TABLE 1(b)

| $2^{nd}$ component's major color index | $2^{nd}$ component's major color value |
|---|---|
| 0 | value [0][$2^{nd}$ color] |
| ... | |
| $N_2$ | value [$N_2$][$2^{nd}$ color] |

TABLE 1(c)

| $3^{rd}$ component's major color index | $3^{rd}$ component's major color value |
|---|---|
| 0 | value [0][$3^{rd}$ color] |
| ... | |
| $N_3$ | value [$N_3$][$3^{rd}$ color] |

TABLE 1(d)

| $1^{st}$ component's major color index | $1^{st}$ component's major color value | $2^{nd}$ component's major color value | $3^{rd}$ component's major color value |
|---|---|---|---|
| 0 | value [0][$1^{st}$ color] | value [0][$2^{nd}$ color] | value [0][$3^{rd}$ color] |
| ... | | | |
| $N_4$ | value [$N_4$][$1^{st}$ color] | value [$N_4$][$2^{nd}$ color] | value [$N_4$][$3^{rd}$ color] |

With palettes and a triplet palette, a pixel can be represented by a triplet index. A decoder first uses the triplet index to find out three major color indexes corresponding to three color components from the triplet. The decoder then uses the major color indexes to find out color values from palettes and reconstruct the pixel. For YUV420 and YUV422, the combination of second layer can be applied to the UV components. Therefore, one palette index (for Y) and one triplet index (for UV) are needed to represent a pixel.

Palette and Triplet Palette Coding

In one example, during decoding, a decoder maintains M sets of palettes and triplet palette predictors. M can be transmitted or derived. In a particular case, M can be 1. If M is larger than 1, the encoder can further signal which predictor is used or the decoder can derive the M.

In another example, a decoder can derive which predictor is used according to the CU size. In other words, CUs with different sizes will use different predictors. Similarly, a decoder can derive which predictor is used according to the PU size or other related unit size.

In one example, a palette predictor contains the last palette size and a palette with NMax entries. NMax can be equal to the size of a current palette and triplet. For a palette coded CU, its palettes or triplet palette to be used can be derived from the predictor.

An example of palette and triplet palette sharing mode is shown as follows. Palette sharing mode can use palette predictors directly without modification. The palette to be used in the current CU is derived according to stored last palette size as shown in the example of Tables 2(a) and 2(b). If stored last palette size is 10, the first 10 entries in the palette predictor will be extracted directly to form a palette for the current CU. Table 2(a) illustrates an example of last palette and Table 2(b) illustrates an example of palette for the current CU derived from the last palette in Table 2(b). Palette sharing mode can also signal a new size value. Then, the palette is derived from the palette predictor directly only with size modification.

TABLE 2(a)

| Predictor | |
|---|---|
| Last palette size | 10 |
| Major color index | Major color value |
| 0 | $Value_0$ |
| 1 | $Value_1$ |
| 2 | $Value_2$ |
| ... | |
| Nmax | $Value_{Nmax}$ |

TABLE 2(b)

| Palette for current CU | |
|---|---|
| Palette size | 10 |
| Major color index | Major color value |
| 0 | $Value_0$ |
| 1 | $Value_1$ |
| 2 | $Value_2$ |
| ... | |
| 9 | $Value_9$ |

An example of palette and triplet palette normal mode is shown as follows. In normal mode, information of palette modification will be signaled to indicate how to derive a palette from the predictor. Tables 3(a)-3(c) illustrates an example to palette derivation. First, the "New size" is signaled to indicate the new palette size, e.g. 3 in Table 3(a). Then, each entry will signal a bit to indicate if the value needs to be modified. If the value needs to be modified, a corresponding new value will be further signaled. For example, if the modifying bits for color indices 0 and 2 indicate value modification (i.e., bit "1") as shown in Table 3(a), new $Value_0$ and $Value_2$ will be updated as shown in Table 3(c) based on the palette predictor in Table 3(b).

TABLE 3(a)

| Modification | |
|---|---|
| New size | 3 |
| Modification bit | Major color value |
| 1 | New $Value_0$ |

TABLE 3(a)-continued

| Modification | |
|---|---|
| 0 | $Value_1$ |
| 1 | New $Value_2$ |

TABLE 3(b)

| Predictor | |
|---|---|
| Last palette size | $Size_o$ |
| Major color index | Major color value |
| 0 | $Value_0$ |
| 1 | $Value_1$ |
| 2 | $Value_2$ |
| ... | |
| Nmax | $Value_{Nmax}$ |

TABLE 3(c)

| Palette for current CU | |
|---|---|
| Palette size | 3 |
| Major color index | Major color value |
| 0 | New $Value_0$ |
| 1 | $Value_1$ |
| 2 | New $Value_2$ |

Palette and triplet palette predictors updating. According to one embodiment, the decoder maintains M sets of palettes and triplet palette predictors during decoding. At the beginning of each slice, the decoder may initialize palette predictors with transmitted or derived values. After decoding of a palette coded CU, the predictors will be updated if the modification is signaled. Tables 4(a)-4(c) illustrate an example of predictor updating. During the decoding of the (N−1)th palette coded CU, a modification is signaled including New Size=3 and the new values of first/third entries. After decoding the (N−1)th palette coded CU, the predictor will be updated accordingly. The updated entries are indicated in Italic style in Table 4(c).

TABLE 4(a)

| Modification | |
|---|---|
| New size | 3 |
| Modification bit | Major color value |
| 1 | New $Value_0$ |
| 0 | $Value_1$ |
| 1 | New $Value_2$ |

TABLE 4(b)

| Predictor | |
|---|---|
| Last palette size | $Size_o$ |
| Major color index | Major color value |
| 0 | $Value_0$ |
| 1 | $Value_1$ |
| 2 | $Value_2$ |
| ... | |
| Nmax | $Value_{Nmax}$ |

TABLE 4(c)

| Predictor | |
|---|---|
| Last palette size | 3 |
| Major color index | Major color value |
| 0 | New Value$_0$ |
| 1 | Value$_1$ |
| 2 | New Value$_2$ |
| ... | |
| Nmax | Value$_{Nmax}$ |

Figure 1:
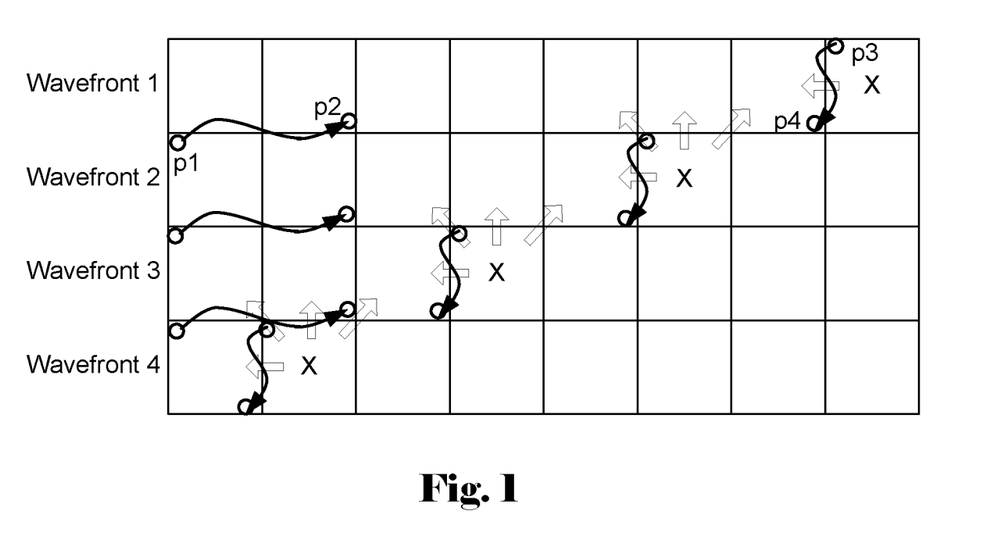

In HEVC, Wavefront Parallel Processing (WPP) is supported, where each row of Coding Tree Units (CTUs) can be processed in parallel as substreams by multiple encoding or decoding threads: In order to limit the degradation of coding efficiency, a wavefront pattern of processing order ensures that dependencies on spatial neighbors are not changed. On the other hand, at the start of each CTU row, the CABAC states are initialized based on the CABAC states of the synchronization point in upper CTU row. An example of WPP for CABAC is shown in FIG. 1, where the parallel processing is applied to CTU rows. Furthermore, it is assumed in this example that the palette coding of each current CTU (marked as "X" in FIG. 1) depends on its left, above-left, above and above-right CTUs. For the top CTU row, the palette processing is dependent on the left CTU only. The synchronization point is the last CU of the second CTU from the upper CTU row. Moreover, CABAC engine is flushed at the end of each CTU row and byte alignment is enforced at the end of each substream. The entry points of WPP substreams are signaled as byte offsets in the slice header of the slice that contains the wavefront.

In FIG. 1, each block stands for one CTU and there are four CTU rows in a picture. Each CTU row forms a wavefront substream that can be processed independently by an encoding or a decoding thread. The "X" symbols represent the current CTU under processing for the multiple threads. Since a current CTU has dependency on the above-right CTU, the processing of the current CTU has to wait for the completion of the above-right CTU. Therefore, there must be two CTUs delay between two processing threads of neighboring CTU rows so that the data dependency (e.g. spatial pixels and MVs) can be preserved. In addition, the CABAC states of the first CTU of each CTU row is initialized with the states obtained after the second CTU of the upper CTU row is processed. For example, the first CU (indicated by "p1") of the first CTU in the second CTU row is initialized after the last CU (indicated by "p2") in second CTU of the above CTU row is processed. The dependency is indicated by a curved arrow line pointing from "p1" to "p2". Similar dependency for the first CTU of each CTU row is indicated by the curved arrows. This allows for a quicker learning of the probabilities along the first column of CTUs than using the slice initialization states for each CTU row. Since the second CTU of the upper CTU row is always available to the current CTU row, parallel processing can be achieved using this wavefront structure. For each current CTU, the processing depends on the left CTU. Therefore, it has to wait until the last CU of the left CTU is processed. As shown in FIG. 1, a first CU (indicated by "p3") in a current CTU has to wait for the last CU (indicated by "p4") of the left CTU to finish. Again, the dependency is indicated by a curved arrow line pointing from "p3" to "p4". Similar dependency on the left CTU is indicated by curved arrows for the CTU being process (indicated by "X").

After the decoding of a palette coded CU, the predictors can be updated if the modification is signaled. The palette and/or triplet palette predictors can be reset at a slice-level, tile level, CTU-row level, or CTU level. A slice, tile, CTU row, or CTU is referred as an image area in this disclosure. An image can be partitioned into multiple image areas parallel processing such as wavefront parallel processing. According to the present invention, the reset can be turned ON when WPP is applied. For the reset process, the palette and triplet palette predictors can be set to a predefined or derived value, such as 0. Alternatively, the palette and triplet palette predictors can inherit the palette and triplet palette of a previously processed block. For example, the palette and triplet palette predictors may inherit the palette and triplet palette of its upper-right block, upper block, or any block in the upper CTU row.

One aspect of the present invention addresses syntax design to improve the efficiency related to palette coding. In palette coding, a palette_share_flag may be first signaled. If palette_share_flag is 1, all the palette colors in the last coded palette are reused for current CU. The current palette size is also equal to the palette size of last coded palette CU. Otherwise (palette_share_flag is 0), the current palette is signaled by choosing which palette colors in the last coded palette can be reused, or by transmitting new palette colors. The size of the current palette is set as the size of the predicted palette (numPredPreviousPalette) plus the size of the transmitted palette (num_signalled_palette_entries). The predicted palette is a palette derived from the previously reconstructed palette coded CUs. When coding the current CU as palette mode, those palette colors which are not predicted using the predicted palette are directly transmitted into the bitstream. For example, if current CU is coded as the palette mode with a palette size equal to six. Assume that three of the six major colors are predicted from the palette predictor and three major colors are directly transmitted through the bitstream. The transmitted three major colors will be signaled using the sample syntax as given below.

```
num_signalled_palette_entries = 3
for( cIdx = 0; cIdx < 3; cIdx++ ) // signal colors for different components
    for( i = 0; i < num_signalled_palette_entries; i++ )
        palette_entries[ cIdx ][ numPredPreviousPalette + i ]
```

In the above example, the number of major colors to be signaled is indicated by num_signalled_palette_entries. Syntax, palette_entries[cIdx][numPredPreviousPalette+i] corresponds to the transmitted color for each color component (i.e., cIdx). Since the palette size is six in this example, the palette indices from 0 to 5 are used to indicate each palette coded pixel could be reconstructed as the major color in the palette color table.

Palette initialization (reset) in WPP. The palette reset for a slice, a tile, a CTU row or a CTU mentioned above can also be applied to the system using WPP. For example, if the WPP is not applied, the last coded palette is initialized (i.e., reset) at the beginning of each slice or at the beginning of each tile. If the WPP is applied, the last coded palette is not only initialized (reset) at the beginning of each slice or at the beginning of each tile, but also initialized (reset) at the beginning of each CTU row. In the palette initialization (reset), all the palette color values in last coded palette are set to be 0. However, setting all the palette colors to 0 at the beginning of each CTU row may degrade the coding efficiency when WPP is applied. Therefore, techniques to further improve the efficiency of palette coding in the WPP system are disclosed.

First embodiment of palette initialization: Inherit the last coded palette from a previously coded CU in the upper CTU row. In the first embodiment of palette initialization, the last coded palette for a previously coded CU in the upper CTU row can be used as the initial palette. At the beginning of each CTU row, the updated last coded palette from one of the CU in the upper CTU row is inherited for the palette initialization. The initial palette colors in the last coded palette of current CTU row are not set to 0. The initial palette colors of the last coded palette of current CTU row are copied from the updated last coded palette of one of the CUs in the upper CTU row. The inherited palette can be used as the palette predictor. The position of the CU to be inherited in the upper CTU row can be predefined. For example, the updated last coded palette of an above CU (i.e., position A in FIG. 2) in the above CTU row is used as the initial last coded palette at the beginning of the current CTU row (i.e., position C in FIG. 2). In another example, the updated last coded palette of the last CU in the upper-right CTU (i.e., position B in FIG. 2) is used as the initial last coded palette at the beginning of the current CTU row (i.e., position C in FIG. 2). The position of the CU to be inherited in upper CTU row can be defined in high-level syntax (e.g. SPS, PPS, VPS, slice-header).

When WPP is turned ON, the palette coding can be applied to the CTU rows in parallel. For the example shown in FIG. 2, the palette coding for each current CTU row is delayed by 2 CTUs with respect to the upper CTU row. After the 2 CTU delay for the beginning CU of the current CTU row, the palette coding of the upper CTU row and the current CTU row may progress forward in the same processing pace to maintain the 2 CTU delay. Similarly, the below CTU row after the current CTU row may start processing the beginning CU of the below CTU row with 2 CTU delay with respect to the current CTU row. The palette coding of the current CTU row and the below CTU row may progress forward in the same processing pace to maintain the 2 CTU delay. Therefore, the palette coding of the CTU rows of a picture can be processed in a staggered fashion with 2 CTU delay for each next CTU row. Accordingly, the CU or the CTU being processed among the CTU rows form a wavefront so that the CTU rows can be processed in parallel after the initial delays.

Figure 2:
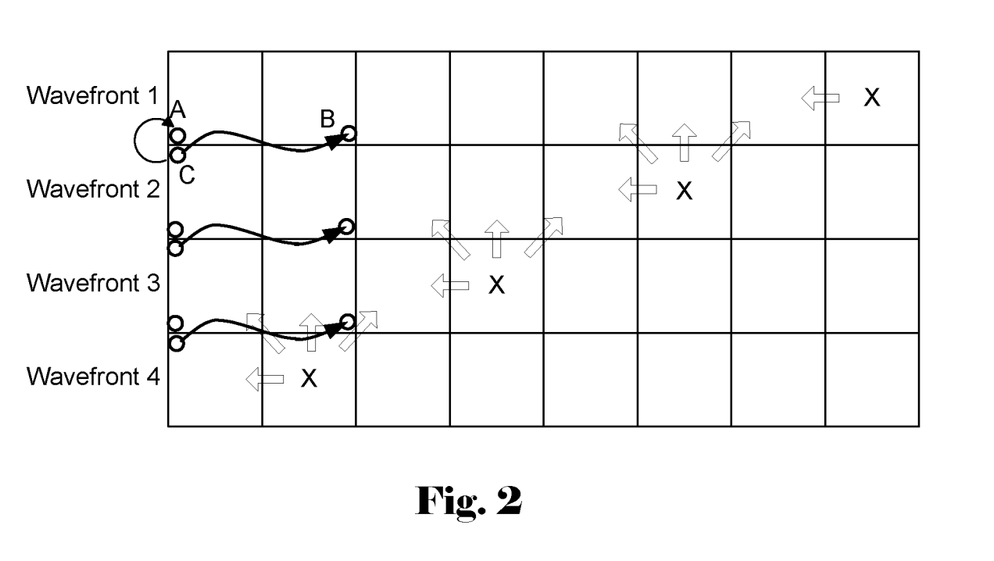
FIG. 2 illustrates an example of initialization of palette/triplet palette for the beginning block of each CTU (coding tree unit) row when the WPP (wavefront parallel processing) is turned ON according to an embodiment of the present invention.

Second embodiment of palette inidalizadon: Inherit the last coded palette from the CU according to the CABAC synchronization point in WPP. In HEVC, at the start of each CTU row, the CABAC states are initialized based on the CABAC states of the synchronization point in the upper CTU row. The position of the synchronization point in upper CTU row can be defined in PPS. According to this embodiment, the synchronization position of CABAC initialization and the inheritance position of the last coded palette initialization are unified. At the beginning of each CTU row, the initial palette colors for the last coded palette of the beginning CU in the current CTU row are copied from the updated last coded palette of the CU at the CABAC synchronization point in upper CTU row. For example, in FIG. 1, the last CU of the second CTU from the upper CTU row is the CABAC synchronization point (labelled as "p2"). In FIG. 2, the updated last coded palette of the last CU (labelled as "B") of the second CTU (i.e., the above-right CTU of the current CTU) from the upper CTU row is used as the initial last coded palette. The CU for states of CABAC synchronization point and the CU for the beginning CU to inherit palette/triplet palette predictors are unified.

Figure 3:
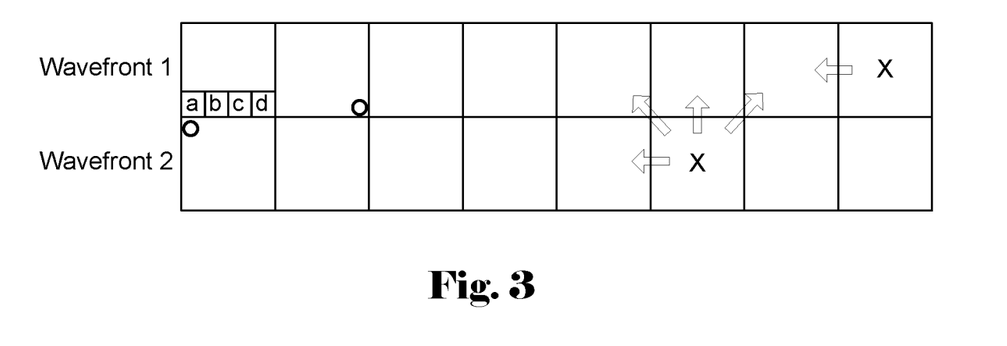
FIG. 3 illustrates an example of initial palette derivation for the beginning CU of the current CTU row using the last coded palette of a nearest CU in the bottom CU row of an above CTU above the current CTU.

Third embodiment of palette inidalizadon: Inherit the last coded palette of a nearest CU in spatial distance in the upper CTU row. According to this embodiment, the updated last coded palette of a nearest CU in above CTU row is used as the initial last coded palette. For example, in FIG. 3, at the beginning of second CTU row, the nearest CU is CU-a in the above CTU of the upper CTU row. If CU-a is palette coded CU, its updated palette is used as the initial last coded palette for second CTU row. If CU-a is not palette coded CU, following CUs (i.e., CU-b, CU-c, CU-d) will be checked in a sequential order to determine whether any CU is palette coded CU. The updated palette of the first palette coded CU in the bottom CU row of above CTU will be used as the initial last coded palette for the current (or following) CTU row. Consequently, the palette of the first palette coded CU in the bottom CU row of the above CTU (i.e., CU-a if available, otherwise CU-b if available, etc.) is stored until it is accessed and used when coding the first palette coded CU in the current or following CTU row. If none of the CUs in the bottom CU row of above CTU is palette coded, the CUs in the second bottom CU row of above CTU may be examined, the palette of the first palette coded CU, from left to right, is used for the current CTU row initialization. If none of the CUs in the second bottom CU row of above CTU is palette coded, the CUs in the third bottom CU row of above CTU is examined and so on until a valid palette is found. In another example, if none of the CUs in the bottom row of above CTU is palette coded, the CUs in the bottom CU row of above-right CTU will be checked, from left to right, the palette of the first palette coded CU is used for current CTU row initialization. If none of the CUs in the bottom CU row of above-right CTU is palette coded, the CUs in the bottom CU row of the CTU on the right side of the above-right CTU will be checked, from left to right. If a palette coded CU is found, the palette of the first palette coded CU is used for the current CTU row initialization.

In another example, the first non-all-zero last coded palette in the upper CTU row will be used as the initial last coded palette for second CTU row. If there is no available palette can be used in the upper CTU row at the CABAC synchronization point, the last coded palette will be initialized to be all 0.

Fourth embodiment of palette initialization: Inherit the nearest last coded palette in coding order. In this embodiment, the updated last coded palette of Nth palette coded CU in above CTU row is used as the initial last coded palette. The N can be 1. In another example, the updated last coded palette of the CU nearest to CU-a in FIG. 3 in coding order is used as the initial last coded palette.

Figure 4:
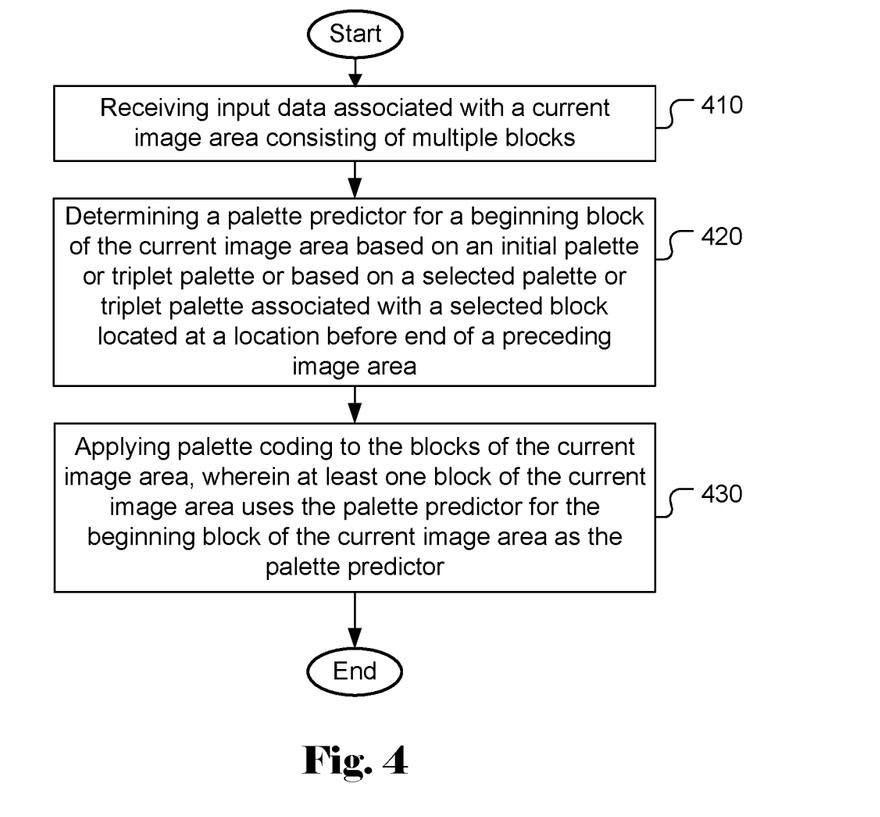
FIG. 4 illustrates an exemplary flowchart of palette coding using an initial palette/triplet palette or a selected palette/triplet palette for the beginning block of each CTU (coding tree unit) row when the WPP (wavefront parallel processing) is turned ON according to an embodiment of the present invention.

FIG. 4 illustrates an exemplary flowchart of palette coding using an initial palette/triplet palette or a selected palette/triplet palette for the beginning block of each CTU (coding tree unit) row when the WPP (wavefront parallel processing) is turned ON according to an embodiment of the present invention. The system receives input data associated with a current image area consisting of multiple blocks as shown in step 410. The input data corresponds to pixel data of the current image area to be coded at an encoder side or corresponds to coded data of the current image area to be decoded at the decoder side. The input data may be retrieved from memory (e.g., computer memory, buffer (RAM or DRAM) or other media) or from a processor. A palette predictor for a beginning block of the current image area is determined based on an initial palette or triplet palette or based on a selected palette or triplet palette associated with a selected block located at a location before end of a preceding image area as shown in step 420. The palette coding is applied to the blocks of the current image area, wherein at least one block of the current image area uses the palette predictor for the beginning block of the current image area as the palette predictor as shown in step 430.

The flowchart shown is intended to illustrate an example of palette coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of coding a block of video data using palette coding in a video coding system, wherein a picture is partitioned into multiple image areas, the method comprising:
    receiving input data associated with a current image area consisting of multiple blocks;
    determining a palette predictor for a beginning block of the current image area based on a palette or triplet palette associated with a selected block corresponding to a right-most coding unit (CU) of a bottom CU row of an above coding tree unit (CTU) immediately above the beginning block of the current image area; and
    applying palette coding to the blocks of the current image area, wherein at least one block of the current image area uses the palette predictor for the beginning block of the current image area as the palette predictor.

2. The method of claim 1, wherein the current image area corresponds to a CTU row, a tile, or a slice.

3. The method of claim 1, wherein the above CTU is next to the current image area in an upper direction.

4. The method of claim 1, wherein the determining the palette predictor for the beginning block of the current image area is further based on an initial palette that corresponds to resetting one or more palette information to zero.

5. The method of claim 1, wherein the determining the palette predictor for the beginning block of the current image area is further based on an initial palette that is set as not available.

6. An apparatus for coding a block of video data using palette coding in a video coding system, wherein a picture is partitioned into multiple image areas, the apparatus comprising:
    one or more electronic circuits configured to:
        receive input data associated with a current image area consisting of multiple blocks;
        determine a palette predictor for a beginning block of the current image area based on a palette or triplet palette associated with a selected block corresponding to a right-most coding unit (CU) of a bottom CU row of an above coding tree unit (CTU) immediately above the beginning block of the current image area; and
        apply palette coding to the blocks of the current image area, wherein at least one block of the current image area uses the palette predictor for the beginning block of the current image area as the palette predictor.

7. The apparatus of claim 6, wherein the current image area corresponds to a CTU row, a tile, or a slice.

8. The apparatus of claim 6, wherein the above CTU is next to the current image area in an upper direction.

9. The apparatus of claim 6, wherein the one or more electronic circuits is configured to determine the palette predictor for the beginning block of the current image area further based on an initial palette that corresponds to resetting one or more palette information to zero.

10. The apparatus of claim 6, wherein the one or more electronic circuits is configured to determine the palette predictor for the beginning block of the current image area further based on an initial palette that is set as not available.

11. A method of coding a block of video data using palette coding in a video coding system, wherein a picture is partitioned into multiple image areas, the method comprising:
    receiving input data associated with a current image area consisting of multiple blocks;
    determining whether the picture is coded according to wavefront parallel processing (WPP);
    in response to the picture is determined to be coded according to the WPP, determining a palette predictor for a beginning block of the current image area based on a palette or triplet palette associated with a selected block corresponding to a coding unit (CU) of a bottom CU row of an above coding tree unit (CTU) immediately above the beginning block of the current image area;

in response to the picture is determined not to be coded according to the WPP, determining the palette predictor for the beginning block of the current image area based on a last coded palette or triplet palette of a previous image area at a time that coding of the current image area begins; and applying palette coding to the blocks of the current image area, wherein at least one block of the current image area uses the palette predictor for the beginning block of the current image area as the palette predictor.

12. The method of claim 11, wherein the current image area corresponds to a CTU row, a tile, or a slice.

13. The method of claim 11, wherein the CU is a right-most CU of the bottom CU row of the above CTU.

* * * * *